United States Patent
Botzer et al.

(10) Patent No.: US 10,037,219 B2
(45) Date of Patent: Jul. 31, 2018

(54) VIRTUAL MACHINE LOCKING

(71) Applicant: Red Hat Israel, Ltd., Ra'anana (IL)

(72) Inventors: David Botzer, Kfar Yona (IL); Oded Ramraz, Ra'anana (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/723,374

(22) Filed: May 27, 2015

(65) Prior Publication Data

US 2016/0350145 A1    Dec. 1, 2016

(51) Int. Cl.
*G06F 9/455* (2018.01)
*H04L 29/06* (2006.01)

(52) U.S. Cl.
CPC ........ *G06F 9/45558* (2013.01); *H04L 63/083* (2013.01); *H04L 63/0876* (2013.01); *H04L 63/102* (2013.01); *G06F 2009/45587* (2013.01); *G06F 2009/45595* (2013.01)

(58) Field of Classification Search
CPC ....... H06F 63/0876; G06F 2009/45587; G06F 2009/45595; G06F 21/44; G06F 9/45558; H04L 63/083; H04L 63/0876; H04L 63/102

See application file for complete search history.

(56) References Cited

U.S. PATENT DOCUMENTS

| | | |
|---|---|---|
| 8,125,986 B2 | 2/2012 | Narayanaswami et al. |
| 8,239,608 B1 | 8/2012 | Ginzton |
| 8,365,294 B2 * | 1/2013 | Ross ........................ G06F 21/33 370/229 |
| 8,756,696 B1 | 6/2014 | Miller |
| 8,806,481 B2 | 8/2014 | Ali et al. |
| 8,839,236 B2 | 9/2014 | Carpenter et al. |
| 8,910,238 B2 * | 12/2014 | Lukacs ................... G06F 21/53 713/164 |
| 8,959,623 B2 | 2/2015 | Fadida et al. |
| 9,317,315 B2 * | 4/2016 | Mehta ................. G06F 9/45558 |
| 2009/0125903 A1 * | 5/2009 | Ohno ........................ G06F 8/36 718/1 |

(Continued)

OTHER PUBLICATIONS

Cartwright, Hersey Using ESXi Lockdown Mode, http://www.vhersey.com/2013/06/using-esxi-lockdown-model, VMware, Jun. 21, 2013, 5 pages.

(Continued)

*Primary Examiner* — Theodore C Parsons
*Assistant Examiner* — Carlos M De Jesus Lassala
(74) *Attorney, Agent, or Firm* — Lowenstein Sandler LLP (57) ABSTRACT

Systems and methods for virtual machine locking. An example method may include: applying a lock to a virtual machine, the lock enabling ongoing execution of the virtual machine and outbound communication by the virtual machine while precluding unauthenticated inbound communication to the virtual machine, receiving, from a first device and in response to an authentication request, an authentication attempt, processing the authentication attempt to authenticate the first device with respect to the virtual machine, and in response to a determination that the first device was successfully authenticated with respect to the virtual machine, enabling inbound communication from the first device to the virtual machine.

20 Claims, 3 Drawing Sheets

(56) References Cited

U.S. PATENT DOCUMENTS

| | | | |
|---|---|---|---|
| 2011/0154320 A1* | 6/2011 | Verma | G06F 8/63 |
| | | | 718/1 |
| 2013/0074165 A1 | 3/2013 | Dhaene | |
| 2013/0152194 A1 | 6/2013 | Barak et al. | |
| 2015/0121369 A1* | 4/2015 | Thankappan | G06F 9/45533 |
| | | | 718/1 |

OTHER PUBLICATIONS

Sam, vSphere Security: Understanding ESXi 5.x Lockdown Mode, http://www.definit.co.uk/2013/09/vsphere-security-understanding esxi-5-x-lockdown-mode/, Sep 26, 2013, 6 pages.

Vivek Nayyar, How and Why to Enable Administrative Lockout in VMware Workstation, http://www.pctips3000.com/how-and-why-to-enable-administrative-lockout-in-vmware-workstation/, Systems Admin in Siskin Technologies, India, Apr. 28, 2011, 9 pages.

Encrypting and Restricting Virtual Machines, https://pubs.vmware.com/workstation-9/index.jsp?topic=%2Fcom.vmware.ws.using.doc%2FGUID-BE89C5A8-FE68-4A3E-9879-869F23F4B6DF.html, 2 pages.

* cited by examiner

VIRTUAL MACHINE LOCKING

TECHNICAL FIELD

Implementations of the present disclosure relate to a computing system, and more specifically, to virtual machine locking.

BACKGROUND

Virtualization entails running programs, usually multiple operating systems, concurrently and in isolation from other programs on a single system. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

DESCRIPTION OF DRAWINGS

The details of one or more implementations are set forth in the accompanying drawings and the description below. Other features and advantages will be apparent from the description and drawings, and from the claims.

DETAILED DESCRIPTION

The present disclosure pertains to virtual machine locking.

It can be appreciated that, in certain scenarios, it may be appropriate and/or acceptable to allow multiple devices/users to concurrently access and utilize a virtual machine (VM). However, in other certain scenarios (e.g., when maintenance or other such operations are to be performed on the virtual machine) it may be disadvantageous for multiple users/devices to concurrently access/utilize the virtual machine. For example, in a scenario in which various maintenance operations are to be performed, such operations may perform relatively less efficiently or may not be capable of execution/completion while multiple users/devices concurrently access/utilize the virtual machine.

Accordingly, described herein are various technologies that enable the selective locking of a virtual machine. The referenced lock can be configured to enable ongoing operation/execution of the virtual machine while precluding inbound access to the virtual machine by users/devices. As such, operation/execution of the virtual machine can be maintained and access to it can be provided to certain users (e.g., administrators) while precluding/preventing access to it by other users.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

For brevity, simplicity and by way of example, a hypervisor performs many of the operations described herein. It is contemplated that other actors may perform some or all of the operations described herein, including a host operating system, multiple hypervisors, a VM lock manager, and the like, including a combination thereof.

Figure 1:
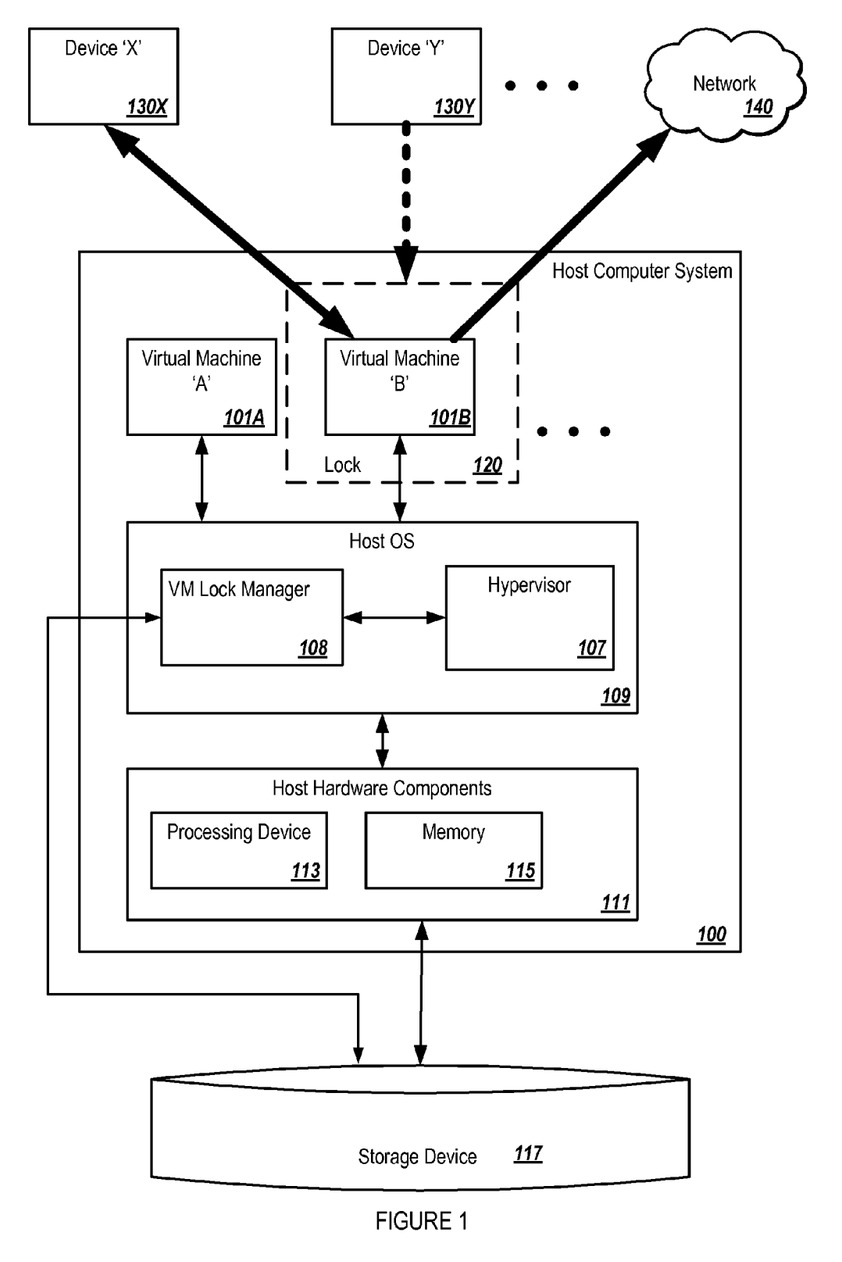
FIG. 1 is a block diagram of a host computer system in accordance with some implementations.

FIG. 1 is a block diagram that illustrates an example of a host computer system 100 that hosts one or more VMs 101A-B. Each VM can run a guest operating system (OS). The VMs may have the same or different guest operating systems, such as Microsoft Windows®, Linux®, Solaris®, Mac® OS, etc. The host computer system 100 may be a server, a workstation, a personal computer (PC), a mobile phone, a palm-sized computing device, a personal digital assistant (PDA), etc.

The host computer system 100 runs a hypervisor 107 to virtualize access to the underlying host hardware, making the use of the VM transparent to the guest OS and a user of the host computer system 100. The hypervisor 107 may also be known as a virtual machine monitor (VMM) or a kernel-based hypervisor. The hypervisor 107 may be part of a host OS 109 (as shown in FIG. 1), run on top of the host OS 109, or run directly on the host hardware without an operating system beneath it (i.e., bare metal). The host OS 109 can be the same OS as the guest OS, or can be a different OS. In certain implementations, the hypervisor 107 can include a virtual machine (VM) lock manager 108 that handles locking operations with respect to various virtual machines 101. In other implementations, VM lock manager 108 can execute/operate outside/independent of hypervisor 107 (e.g., as shown in FIG. 1), and may be configured to communicate with hypervisor 107, e.g., in order to provide information pertaining to certain operations (such as those described herein) to the hypervisor. Some implementations of VM lock manager 108 will be discussed in more detail below in conjunction with FIG. 2.

As depicted in FIG. 1, in certain scenarios (such as are described herein), a lock 120 can be applied by VM lock manager 108 and/or hypervisor 107 to a virtual machine (e.g., virtual machine 101B). Such a lock can, for example, enable the ongoing execution/operation of the virtual machine while selectively preventing/precluding inbound communications to the virtual machine from certain devices (e.g., device 130Y) and allowing inbound communications to the virtual machine from other devices (e.g., device 130X). It should be understood that such devices can be desktop/laptop computers, terminals, servers, mobile devices, other virtual machines, and/or any other computing devices capable of communicating with, accessing, and/or utilizing virtual machines. Additionally, as depicted in FIG. 1, in certain implementations the referenced lock 120 can enable outbound communications from the virtual machine to other devices, resources, etc. (e.g., network 140 which can be, for example, an intranet, the Internet, etc.). It should also be understood that, in certain implementations, lock 120 can be an application or process such as may be associated with a particular virtual machine (e.g., with the virtual machine ID of the virtual machine) and can be configured to enable, disable, and/or preclude/prevent the various operations described herein. Such an application/process can, for example, enable ongoing execution of a virtual machine as well as outbound communication by the virtual machine while precluding unauthenticated inbound communication to the virtual machine. By way of further example, the referenced application/process can process various authentication attempts that are received with respect to the locked virtual machine. Upon determining that an authentication attempt is successful, the application/process can, for example, enable inbound communication from the device/user that has been authenticated. The various parameters associated with the referenced operations (such as those described and/or referenced herein, e.g., the virtual machine ID associated with the lock, the parameters of the lock, e.g., those users/devices that are/are not precluded from inbound access to the virtual machine, etc.) can be stored in the data store. In doing so, lock 120 can operate in a manner consistent with the dictated/defined parameters of the applied lock.

The host computer system 100 includes hardware components 111 such as one or more physical processing devices (e.g., central processing units (CPUs)) 113, memory 115 (also referred to as "host memory" or "physical memory") and other hardware components. In one implementation, the host computer system 100 includes one or more physical devices (not shown), which can be audio/video devices (e.g., video cards, sounds cards), network interface devices, printers, graphics modules, graphics devices, system components (e.g., PCI devices, bridges, ports, buses), etc. It is understood that the host computer system 100 may include any number of devices.

The host computer system 100 may also be coupled to one or more storage devices 117 via a direct connection or a network. The storage device 117 may be an internal storage device or an external storage device. Examples of storage devices include hard disk drives, optical drives, tape drives, solid state drives, and so forth. Storage devices may be accessible over a local area network (LAN), a wide area network (WAN) and/or a public network such as the internet. Examples of network storage devices include network attached storage (NAS), storage area networks (SAN), cloud storage (e.g., storage as a service (SaaS)), and so forth.

Figure 2:
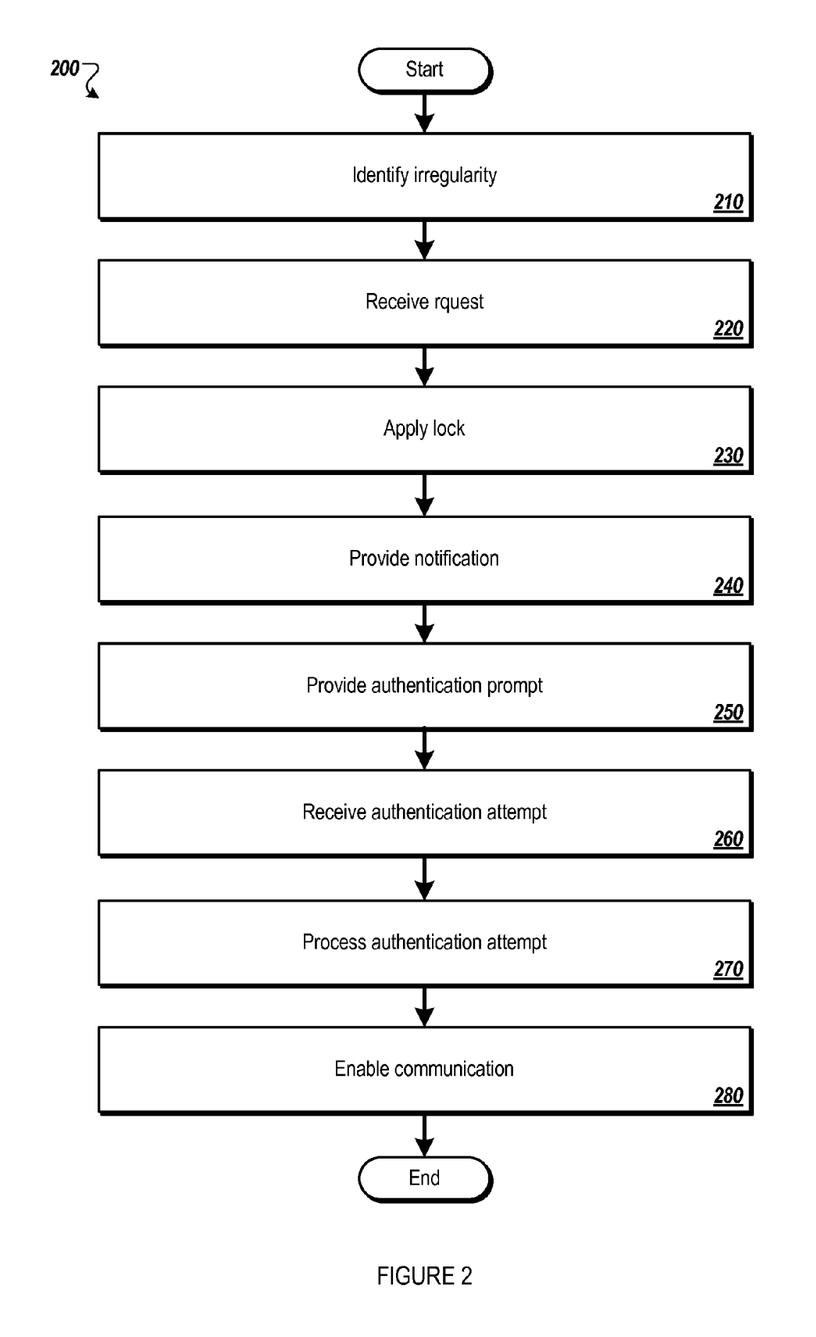
FIG. 2 is a flow diagram of a method for virtual machine locking in accordance with some implementations.

FIG. 2 is a flow diagram of a method 200 for to virtual machine locking in accordance with some implementations. Method 200 can be performed by processing logic (e.g., in computing system 300 of FIG. 3) that may comprise hardware (e.g., circuitry, dedicated logic, programmable logic, microcode, etc.), software (such as instructions run on a processing device), firmware, or a combination thereof. In one implementation, method 200 is performed by hypervisor 107 and/or VM lock manager 108 of FIG. 1. For clarity of presentation, the description that follows uses the system 100 as examples for describing the method 200. However, another system, or combination of systems, may be used to perform the method 200.

At block 210, an irregularity can be identified. In certain implementations, such an irregularity can be identified with respect to an operation of a virtual machine (e.g., virtual machine 101B as depicted in FIG. 1). For example, VM lock manager 108 and/or hypervisor 107 can monitor, scan, and/or otherwise analyze the operation of one or more virtual machines. In doing so, various malfunctions, irregularities, etc. with respect to the operation of the virtual (and/or a suspicion thereof) can be identified. By way of illustration, various inbound or outbound network activity may indicate that the virtual machine is being accessed or utilized in an inappropriate or unauthorized manner and/or for inappropriate or unauthorized purposes.

At block 220, a request can be received (e.g., by VM lock manager 108 and/or hypervisor 107). In certain implementations, such a request can be a request to perform an operation, such as an operation in relation to the virtual machine (e.g., virtual machine 101B as depicted in FIG. 1). Examples of such operations include but are not limited to maintenance operations. That is, it can be appreciated that while, in many scenarios, it may be appropriate and/or acceptable (with respect to the ongoing operation of a virtual machine) to allow multiple devices/users to concurrently access and utilize the virtual machine, in certain scenarios (e.g., when maintenance or other such operations are to be performed on the virtual machine) it may be disadvantageous for multiple users/devices to concurrently access/utilize the virtual machine. For example, in a scenario in which various maintenance operations are to be performed, such operations may perform relatively less efficiently or may not be capable of execution/completion while multiple users/devices concurrently access/utilize the virtual machine. Accordingly, as described herein, a lock can be applied to the virtual machine which can, for example, enable ongoing operation/execution of the virtual machine while precluding access by such users/devices.

At block 230, a lock can be applied to a virtual machine (e.g., virtual machine 101B as depicted in FIG. 1). In certain implementations, the referenced lock can enable ongoing execution of the virtual machine (e.g., even while the lock remains applied). Moreover, in certain implementations the referenced lock can enable outbound communication by the virtual machine (e.g., to network 140, as shown in FIG. 1). In addition, in certain implementations the referenced lock (e.g., as applied by VM lock manager 108 and/or hypervisor 107 in relation to one or more virtual machines) can preclude unauthenticated inbound communication originating from a device (e.g., from device 130Y as depicted in FIG. 1) to the virtual machine (e.g., to virtual machine 101B as depicted in FIG. 1).

Moreover, in certain implementations the referenced lock can be configured to permit unauthenticated inbound communication to the virtual machine that originates from a particular device (e.g., device 130X as depicted in FIG. 1). For example, a user/device such as an administrator or owner of the virtual machine can selectively apply the referenced lock, such as with respect to one or more other devices. Though the referenced lock has been applied with respect to certain user(s)/device(s), the lock need not necessarily apply to other user(s)/device(s). Thus, for example, the virtual machine owner/administrator can apply a lock which precludes/prevents inbound communications from other users/devices, but which permits (even without authentication/authorization) inbound communications, etc. to the virtual machine that can be determined to originate from the owner/administrator.

By way of illustration, FIG. 1 depicts an application of lock 120 (by VM lock manager 108 in conjunction with hypervisor 107) to virtual machine 101B. As shown in FIG. 1, lock 120 can preclude/prevent inbound communication from one device/user (e.g., device 130Y) while allowing inbound communication from another device/user, such as an administrator or owner of the virtual machine (e.g., device 130X). In doing so, for example, the device/user that maintains access virtual machine can perform various operations (e.g., maintenance operations) on the virtual machine without the interference of other user(s)/device(s) that may otherwise have had access to the virtual machine.

It should also be noted that, in various scenarios the referenced lock can be configured to restrict a particular function of the virtual machine with respect to certain devices/users. For example, while in certain scenarios that referenced lock can preclude inbound communication by certain devices to the virtual machine (as described herein), in other scenarios the referenced lock can be configured to allow such inbound communication but to restrict the operation of/access to the virtual machine in one or more other ways, such as by providing the user/device with read-only access to the virtual machine. It should be further understood that the lock can be configured to restrict utilization of/communications to the virtual machine in different ways with respect to different users. For example, the lock may preclude/prevent all inbound communications from one device/user, while providing another device/user with read-only access to the virtual machine.

Additionally, in certain implementations the lock can be applied to the virtual machine in response to an identification of an irregularity (e.g., as identified at 210). That is, in certain scenarios it may be advantageous to apply the referenced lock in an automated manner, such as in response to one or more observed or determined occurrences, such as those that may indicate an irregularity, malfunction, etc. with respect to the operation of the virtual machine. Such an irregularity/malfunction can be determined, for example, based on network traffic patterns (which may reflect that the virtual machine is being used in an inappropriate or unauthorized manner). Accordingly, having identified such an irregularity, VM lock manager 108 and/or hypervisor 107 can employ lock 120, such as in relation to the virtual machine(s) that is/are affected.

In certain implementations, the lock can be applied to the virtual machine in response to a request to perform an operation (e.g., a request received at block 220). Such an operation can be, for example, a maintenance operation. That is, as described herein, in certain scenarios (e.g., when maintenance or other such operations are to be performed on the virtual machine) it may be disadvantageous for multiple users/devices to concurrently access/utilize a virtual machine. Accordingly, the referenced lock can be applied to the virtual machine, thereby enabling ongoing operation/execution of the virtual machine (and performance of the referenced operations, e.g., maintenance) while precluding access by users/devices which may otherwise disrupt the performance of the referenced operations.

It should be understood that while, in certain implementations, the referenced lock can be maintained with respect to the virtual machine until it is lifted/removed (e.g., by an administrator/owner of the virtual machine), in other scenarios the referenced lock can be lifted/removed in an automated fashion. For example, in a scenario in which the lock is applied in response to an operation (e.g., a maintenance operation) being initiated/performed with respect to the virtual machine, upon determination that the operation has been completed, the lock can be lifted/removed.

At block 240, a notification can be provided. In certain implementations, such a notification can be provided (e.g., by VM lock manager 108 and/or hypervisor 107) in response to an application of the lock (e.g., as applied at 230). Moreover, in certain implementations such a notification can be provided to a device that was previously connected to the virtual machine (e.g., until the lock was applied). That is, it can be appreciated that various users/devices (e.g., device 130Y as depicted in FIG. 1) may be in communication with/utilizing a virtual machine (e.g., virtual machine 101B) prior to the application of the lock. Accordingly, when the lock is applied, one or more notifications can be generated and provided to such users/devices. Such notifications can, for example, advise such users/devices that the virtual machine is currently locked (e.g., for maintenance). Examples of such notifications include but are not limited to pop up messages/notifications, email notifications, etc., that can be sent or otherwise transmitted to the users/devices affected by the lock.

At block 250, a device can be prompted (e.g., by VM lock manager 108 and/or hypervisor 107) to authenticate (e.g., in response to an application of the lock). In certain implementations, such a device can be a device that was previously connected to the virtual machine (e.g., until the lock was applied). For example, when a lock is applied to a virtual machine, the lock can request/require authentication (e.g., a password or other such credential) in order to access/utilize the virtual machine. Accordingly, when a device (e.g., device 130Y) attempts to access or utilize a virtual machine that is currently locked (e.g., virtual machine 101B, as depicted in FIG. 1), the device can be prompted to authenticate (e.g., to input a password, etc.) in order to gain access to the locked virtual machine.

At block 260, an authentication attempt can be received. In certain implementations, such an authentication attempt can be received (e.g., by VM lock manager 108 and/or hypervisor 107) from a device (e.g., device 130Y as depicted in FIG. 1). Moreover, in certain implementations such an authentication attempt can be received in response to an authentication request or prompt (e.g., the prompt provided at block 250). For example, as depicted in FIG. 1, a device/user (e.g., device 130Y) that wishes to access/utilize a virtual machine that is locked (e.g., virtual machine 101B) can attempt to authenticate itself (e.g., provide a password, credential, etc.).

At block 270, an authentication attempt can be processed (e.g., by VM lock manager 108 and/or hypervisor 107). In doing so, a device (e.g., the device from which the authentication attempt is received, such as at 260) can be authenticated, such as with respect to the virtual machine (e.g., the virtual machine to which the lock was applied, such as at 230).

At block 280, inbound communication can be enabled to the virtual machine (e.g., by VM lock manager 108 and/or hypervisor 107). In certain implementations, such communication can be communication from a particular device (e.g., the device that was authenticated at 270). Additionally, in certain implementations such communication(s) to the virtual machine can be enabled in response to a determination that the referenced device was successfully authenticated with respect to the virtual machine (e.g., the device that was authenticated at 270). For example, upon successfully authenticating (e.g., providing a password, credential, etc., that authenticates the device/user with respect to the virtual machine that is locked), the virtual machine can enable/allow the authenticated user/device to transmit inbound communications to it.

It should be understood that while the forgoing description has provided various illustrations of the referenced locking technologies with respect to one or more virtual machines, such technologies can also or alternatively be employed in relation to one or more other elements or components. For example, the described technologies can be implemented in order to lock a storage device, a host, a cluster of virtual machines, and/or a data center.

Figure 3:
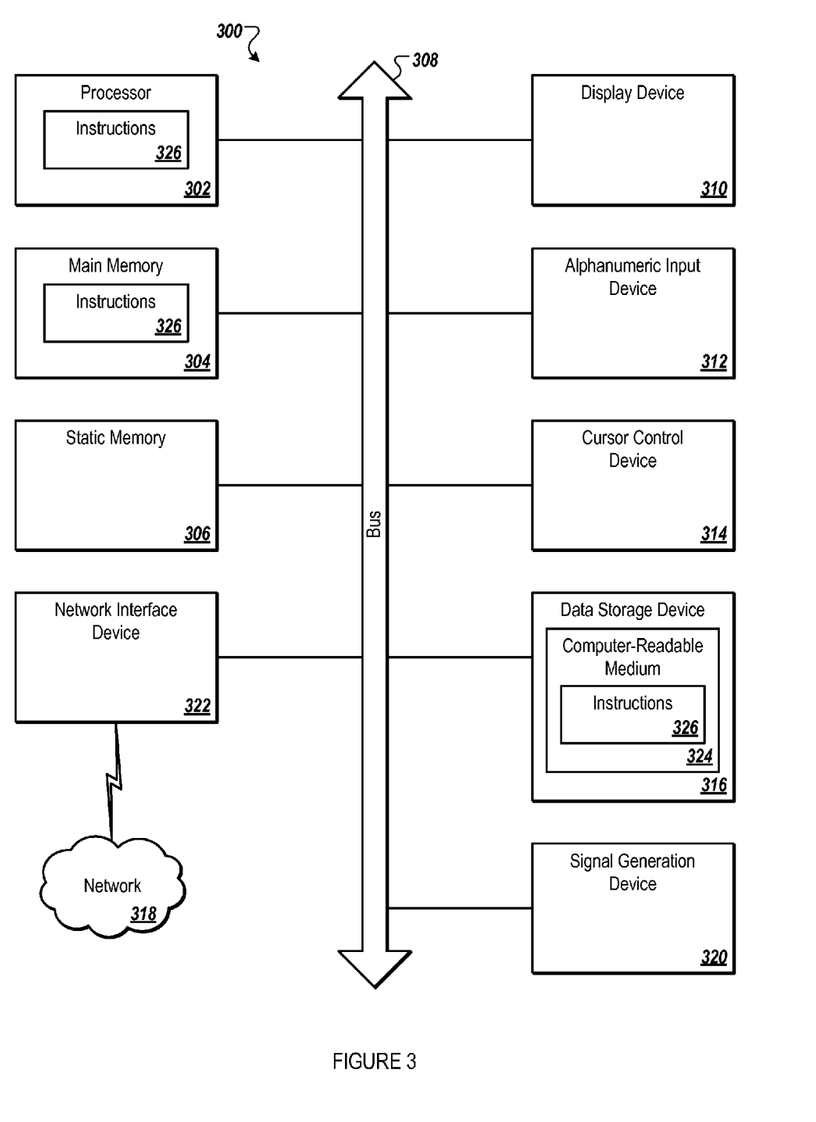
FIG. 3 is a schematic diagram that shows an example of a machine in the form of a computer system.

FIG. 3 is a schematic diagram that shows an example of a machine in the form of a computer system 300. The computer system 300 executes one or more sets of instructions 326 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 326 to perform any one or more of the methodologies discussed herein.

The computer system 300 includes a processor 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 316, which communicate with each other via a bus 308.

The processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions of the host computer system 100 for performing the operations and steps discussed herein.

The computer system 300 may further include a network interface device 322 that provides communication with other machines over a network 318, such as a local area network (LAN), an intranet, an extranet, or the Internet. The computer system 300 also may include a display device 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable storage medium 324 on which is stored the sets of instructions 326 of the host computer system 100 embodying any one or more of the methodologies or functions described herein. The sets of instructions 326 of the host computer system 100 may also reside, completely or at least partially, within the main memory 304 and/or within the processor 302 during execution thereof by the computer system 300, the main memory 304 and the processor 302 also constituting computer-readable storage media. The sets of instructions 326 may further be transmitted or received over the network 318 via the network interface device 322.

While the example of the computer-readable storage medium 324 is shown as a single medium, the term "computer-readable storage medium" can include a single medium or multiple media (e.g., a centralized or distributed database, and/or associated caches and servers) that store the sets of instructions 326. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "applying", "receiving", "processing", "enabling", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
applying a lock at a virtualization manager for a virtual machine while the virtual machine is in communication with at least one of a first device or a second device, the lock enabling ongoing execution of the virtual machine to receive inbound communication from the first device and to restrict inbound communication from the second device;
receiving, from the second device, an authentication attempt;
processing, by a processing device, the authentication attempt to authenticate the second device with respect to the virtual machine; and
in response to a determination that the second device was successfully authenticated with respect to the virtual machine, enabling inbound communication from the second device to the virtual machine.

2. The method of claim 1, wherein applying the lock to the virtual machine comprises applying the lock to the virtual machine with respect to the second device to preclude unauthenticated inbound communication from the second device to the virtual machine.

3. The method of claim 2, wherein the lock is to permit unauthenticated inbound communication from the first device to the virtual machine.

4. The method of claim 1, further comprising identifying an irregularity with respect to an operation of the virtual machine.

5. The method of claim 4, wherein applying the lock to the virtual machine comprises applying the lock to the virtual machine in response to an identification of the irregularity.

6. The method of claim 1, further comprising: in response to an application of the lock, providing a notification of the lock to the second device that was previously connected to the virtual machine.

7. The method of claim 1, further comprising: in response to an application of the lock, prompting the second device that was previously connected to the virtual machine to authenticate.

8. The method of claim 1, further comprising receiving a request to perform an operation in relation to the virtual machine.

9. The method of claim 8, wherein applying the lock to the virtual machine comprises applying the lock to the virtual machine in response to the request to perform the operation.

10. The method of claim 9, wherein the operation comprises a maintenance operation.

11. A system comprising:
a memory; and
a processing device, operatively coupled to the memory, to:
apply a lock at a virtualization manager to a virtual machine while the virtual machine is in communication with at least one of a first device or a second device, the lock enabling ongoing execution of the virtual machine and outbound communication by the virtual machine to receive inbound communication from the first device and to restrict inbound communication from the second device; receive, from the second device, an authentication attempt;
process the authentication attempt to authenticate the second device with respect to the virtual machine; and
in response to a determination that the second device was successfully authenticated with respect to the virtual machine, enable inbound communication from the second device to the virtual machine.

12. The system of claim 11, wherein to apply the lock to the virtual machine the processing device is further to apply the lock to the virtual machine with respect to the second device to preclude unauthenticated inbound communication from the second device to the virtual machine.

13. The system of claim 12, wherein the lock is to permit unauthenticated inbound communication from the first device to the virtual machine.

14. The system of claim 11, wherein the processing device is further to identify an irregularity with respect to an operation of the virtual machine, and to apply the lock to the virtual machine the processing device is further to apply the lock to the virtual machine in response to an identification of the irregularity.

15. The system of claim 11, wherein the processing device is further to receive a request to perform an operation in relation to the virtual machine.

16. The system of claim 15, wherein to apply the lock to the virtual machine the processing device is further to apply the lock to the virtual machine in response to the request to perform the operation.

17. The system of claim 16, wherein the operation comprises a maintenance operation.

18. A non-transitory computer-readable storage medium having instructions that, when executed by a processing device, cause the processing device to:
identify an irregularity with respect to an operation of a virtual machine;
in response to an identification of the irregularity, apply a lock at a virtualization manager for the virtual machine while the virtual machine is in communication with at least one of a first device or a second device, the lock enabling ongoing execution of the virtual machine to receive inbound communication from the first device and to restrict inbound communication from the second device;
receive, from the second device, an authentication attempt;
process the authentication attempt to authenticate the second device with respect to the virtual machine; and
in response to a determination that the second device was successfully authenticated with respect to the virtual machine, enable inbound communication from the second device to the virtual machine.

19. The non-transitory computer-readable storage medium of claim 18, wherein to apply the lock to the virtual machine the processing device is further to apply the lock to the virtual machine with respect to the second device such that the lock precludes unauthenticated inbound communication from the second device to the virtual machine.

20. The non-transitory computer-readable storage medium of claim 19, wherein the lock is to permit unauthenticated inbound communication from the first device to the virtual machine.

* * * * *